United States Patent [19]

Colombani

[11] 4,093,495
[45] June 6, 1978

[54] APPARATUS FOR REMOVING A TIRE FROM A BUILDING DRUM OF A TIRE BUILDING MACHINE

[75] Inventor: Bruno Colombani, Milan, Italy

[73] Assignee: Industrie Pirelli S.p.A., Milan, Italy

[21] Appl. No.: 809,761

[22] Filed: June 24, 1977

[30] Foreign Application Priority Data

Jun. 28, 1976 Itlay .................................. 24790/76

[51] Int. Cl.² .......................................... B29H 17/00
[52] U.S. Cl. .................................. 156/394; 156/126; 156/405 P; 214/330
[58] Field of Search ................ 156/111, 123 R, 126, 156/127, 128, 129, 394, 396, 405, 406; 211/20, 23; 212/71, 116, 134–137; 214/1 PB, 46.22, 46.3, 47, 330–333, 507, 514, 82

[56] References Cited

U.S. PATENT DOCUMENTS

| | | | |
|---|---|---|---|
| 3,442,746 | 5/1969 | Robertson | 156/111 |
| 3,787,262 | 1/1974 | Appleby et al. | 156/420 |
| 3,850,731 | 11/1974 | Brey et al. | 156/111 |
| 3,865,670 | 2/1975 | Habert | 156/126 |
| 3,909,335 | 9/1975 | Jellison | 156/126 |
| 4,039,366 | 8/1977 | Yabe | 156/126 |

*Primary Examiner*—William A. Powell
*Assistant Examiner*—John E. Kittle
*Attorney, Agent, or Firm*—Stevens, Davis, Miller & Mosher

[57] ABSTRACT

A device for removing a tire from the drum of a tire building machine is mounted on the transfer ring of the device which transfers the assembled plies of a breaker structure to the tire building drum. The device has a frame-like cradle with a pivotable bottom member and a drive member for moving the frame-like member against a bottom segment of the tire. It also has a swinging arm member and a fluid actuated cylinder for disposing the arm against a side of the tire. The swinging arm structure is movable parallel to the axis of the drum to slide a shaped tire from the drum. The pivotable bottom of the cradle-like member is pivoted to discharge the tire.

12 Claims, 5 Drawing Figures

APPARATUS FOR REMOVING A TIRE FROM A BUILDING DRUM OF A TIRE BUILDING MACHINE

This invention relates to an apparatus for mechanically removing a vehicle tire from a tire building drum of a tire building machine and transferring it from the drum to subsequent processing apparatus.

The conventional tire building apparatus has a revolving drum, on which the tire is first made, and then shaped. A tubular bag which forms part of the building drum is inflated with compressed air and supports the tire as it is built.

Certain machines of this type also have a drum on which the plies of the breaker structure are wound. This drum is coaxial with the tire building-drum. The machine also has a transfer ring which moves in the direction of the drum axis for transferring the assembled fabric plies of the breaker from the drum on which they are assembled to the tire building drum.

In the conventional machine of the type described, the operation of removing the shaped tire from the building-drum and shifting it away from the machine towards the zone for the next step in the tire building process is usually done by an operator, who, after the air has been expelled from the tubular bag of the building-drum, manually exerts axial forces of a suitable intensity and direction on the tire to allow the tire to slide along the drum and fall off. He then carries the tire away from the vicinity of the machine itself.

These manual operations require considerable exertion of rather long duration, depending on the ability and experience of the operator. This interruption in the tire building process is disadvantageous because the greater part of the tire building process is carried out mechanically without manual labor. Moreover, such manual operation is very difficult if the tire is of a large size.

An object of the present invention is to provide an apparatus for mechanically removing a shaped tire from the tire building drum and transferring the tire from the tire building machine. Still another object of the invention is to provide a device on a tire building machine which will slide a tire from the tire building drum after the tire has been shaped on a conventional inflated bag and remove the tire from the machine.

Other objects will become apparent from the following description with reference to the accompanying drawing wherein FIG. 1 is a schematic fragmentary elevation of a tire building machine provided with one embodiment of this invention;

The objects of the invention are accomplished by providing a device having a mobile frame adapted to support a tire and means for moving the frame in a first direction parallel to the axis of the drum, and in a second direction which is perpendicular to the axis of the drum, the mobile frame being provided with means for supporting the tire comprising a primary series of rotating rollers which are adapted to be brought into contact with preestablished zones on the surface of the tire in rotation and to be pulled into rotation by the tire, and means for unloading the tire from the frame which is capable of removing the tire with respect to the frame, by moving in an orthogonal direction to that of the axis of the building-drum, the means for controlling the movement of the frame being activated successively for the purpose of moving the frame primarily in the first direction, and in such a way as to take it substantially below the finished tire on the building-drum, and then for moving the frame in the second direction and in such a way as to take the rotating rollers of the supportings means in contact with the tire zone, and for moving the frame successively, in the first direction but in the opposite sense to the preceding one, in such a way as to remove the tire from its building-drum, and the means for unloading the tire from the frame being operated after the actuation of means for operating the movement of the frame for removing the tire with respect to the frame itself in the orthogonal direction of the axis of the building-drum, and for unloading the tire from the frame.

The present invention will be better understood from the description of one embodiment thereof with reference to the accompanying drawing.

Figure 1:
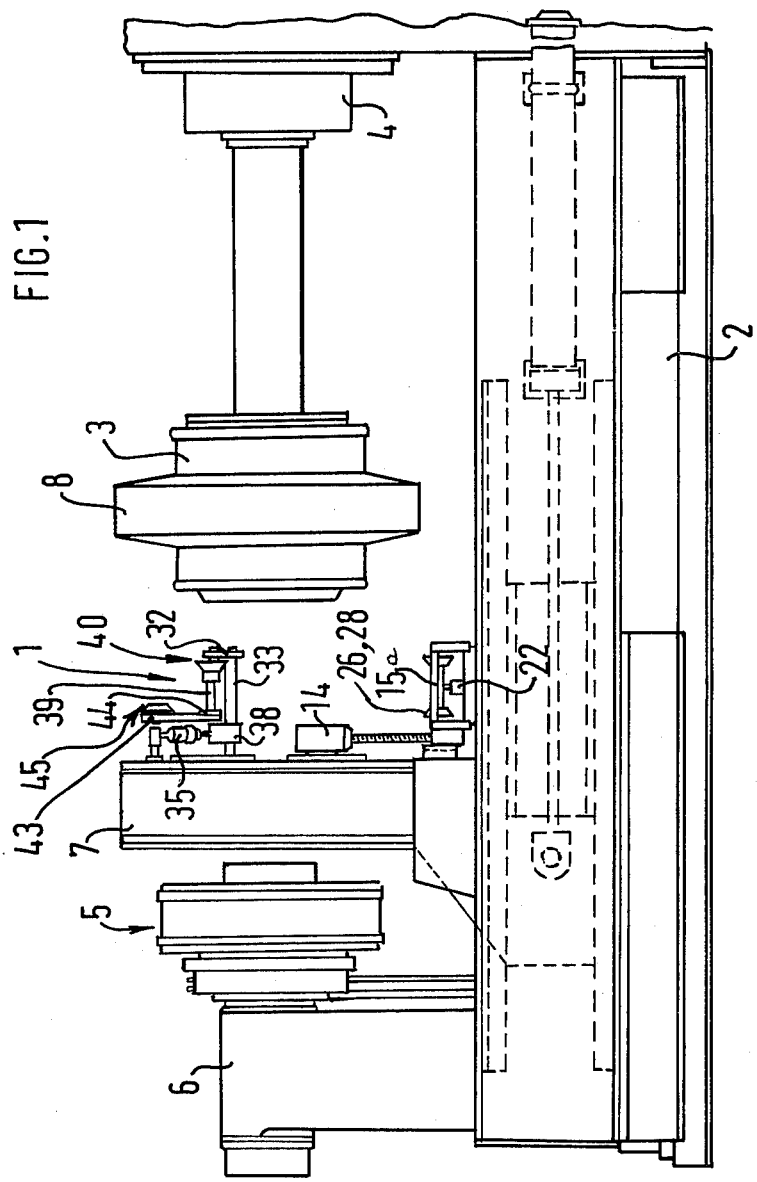

In FIG. 1 of the drawing, the device provided by the invention is identified generally as 1. Device 1, is installed on a tire-building machine which is represented schematically in FIG. 1. This machine has a supporting framework 2, a rotatable tire building-drum 3 supported in cantilever fashion on a shaft actuated by a control unit 4, a winding-drum 5 for the belt plies actuated by a control unit 6, and at least one transfer ring 7 for moving an assembly of plies for a breaker structure from drum 5 to drum 3. The building-drum 3 has a conventinal annular bag adapted to be inflated with compressed air for supporting a tire 8 as it is built and shaped.

The assembling of the plies for the breaker structure is built on the winding-drum 5, and is transferred onto the other drum 3, by means of the transfer ring 7. When this assembly has been prepared on drum 5 by winding onto it a pre-established number of plies, the ring 7 moves to the left in FIG. 1, until it completely encircles the assembly of plies and drum 5 to enable it to grasp the assembly and move it to the right towards drum 3 and transfer the assembly to drum 3.

Figure 2:
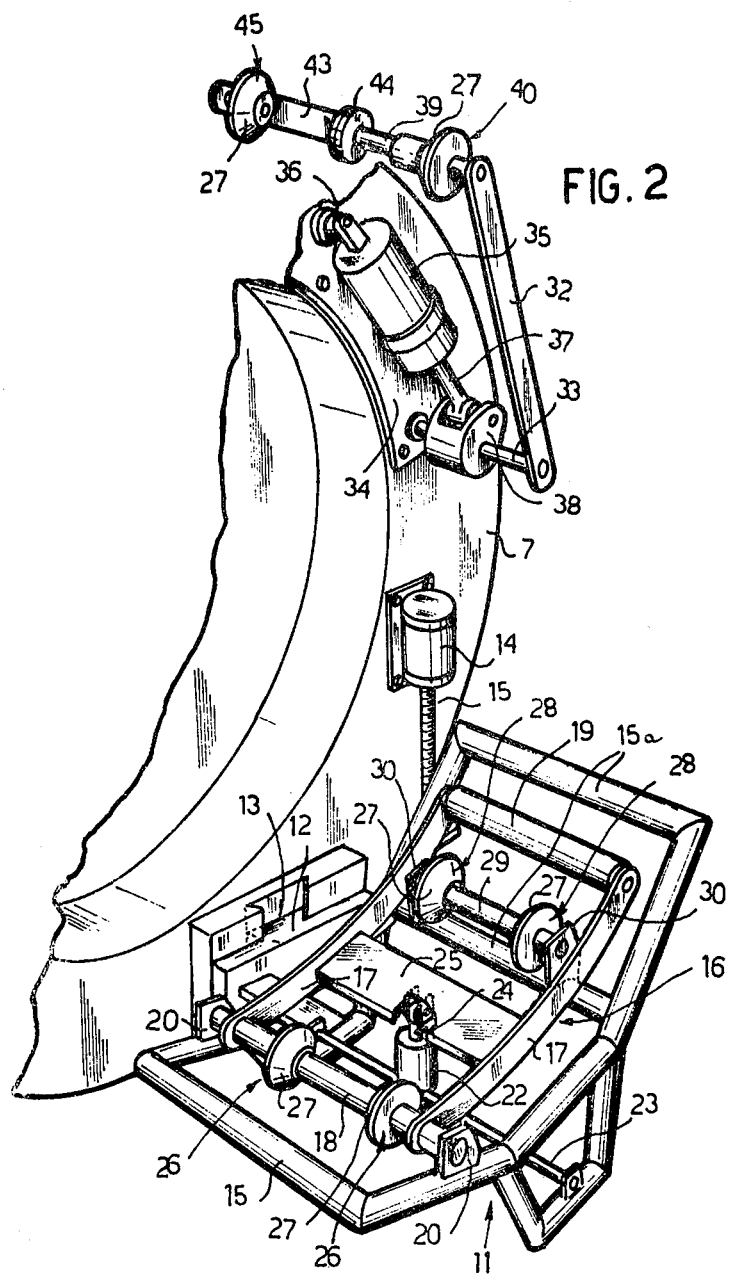
FIG. 2 is an enlarged schematic perspective view of the embodiment of the invention shown in FIG. 1.

The device of the invention is visible perspectively in FIG. 2. It has a frame 11, which is fixed in any convenient manner to a mobile slide 12, which is slidable in the vertical direction on the fixed plate 13 connected to the lateral surface of the transfer ring 7 which faces the building-drum 3. Between the plate 13 and slide 12, suitable guides are predisposed for permitting shifting of the frame 11 in the vertical direction with respect to the ring 7. This shifting is achieved with an electric motor 14, which rotates a threaded shaft 15 which engages a nut-screw (not represented) fast with the slide 12 of the frame.

Frame 11 can be constructed conveniently from lengths of tubular elements including a plurality of transoms 15a disposed parallel to the rotation axis of the building-drum 3. A loom 16 revolves on frame 11 and comprises a pair of elements 17, having a pre-established curvature for adapting them in a manner to be explained later, to the curvature of a tire disposed on the device, and a pair of rectilinear elements 18 and 19. For convenience sake, the loom 16 is revolvable around the axis of the element 18, as is apparent in FIG. 2. For this purpose, a spindle is coupled on the inner side of element 18. The ends of the spindle are hinged in apertures in the fins 20 with the frame. The rotational movement of this loom is controlled by a fluid-dynamic cylinder 22, the body and shaft of which are suitably hinged respectively to a pole 23 of the frame, and to a slab 25 fast with the loom itself. This cylinder is preferably of the telescopic type, capable that is, of determining the axial movements of the ends of the shaft 24 by considerable excursions.

On the element 18 of the loom 16, there is a rotatable pair or rollers 26, each of which is provided with a substantially conical surface 27, suitable for brining it into contact, in a manner to be explained further on, with the external surface of the tire. For convenience, the two rollers 26 and 27 rotate together with that part of element 18 which is disposed between them.

Another pair of rotatable rollers 28 is supported by a spindle 29, hinged onto apertures in the fins 30, fast with a transom 15a of the frame 11.

Figure 4:
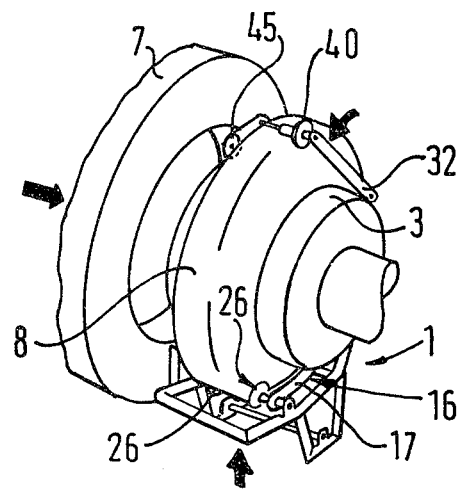
FIG. 4 is a perspective view of the device of the invention disposed about a tire on the tire building drum.

The relative position of the rollers 26 and 28 is such to allow it to support on its conical surface 27, a tire which is placed on the rollers themselves, as is shown in FIG. 4

The device of the invention also has a swinging arm 32, fast with a spindle 33, rotatable on a plate 34 fixed to the transfer ring 7 of the machine, as shown in FIG. 2. The rotation of the arm 32 is controlled by a fluid-dynamic cylinder 35, the body of which is hinged in 36, to plate 34, and its shaft 37 is joined to a crank 38 fast with the spindle 33.

The end of spindle 39 is fixed to one end of the swinging arm 32, spindle 39 is substantially parallel to the rotational axis of the building-drum 3. At least one roller 40, similar to rollers 26 and 28 is rotatable disposed on spindle 39. To the other extremity of spindle 39, there is joined a lever 43, placed in a plane which is substantially parallel to the plane where the swinging arm 32 is disposed, and the angular position of which, with respect to the latter, can be regulated by means of a clutch 44. On the end of the arm 43, another roller 45, identical to roller 40, is rotatable. The two rollers 45 and 40, are spaced in the direction of the rotation axis of the building drum 3, to the extent of having (when the swinging arm 32 is opportunely rotated) their conical surfaces 27 in contact with the surface of the tire mounted on the device, as shown in FIG. 4. As can be seen in FIG. 4, the conical surface 27 of the roller 40 is substantially in contact with the surface of one of the tire sidewalls, while the surface of the roller 45 is in contact with the surface of the other sidewall.

The operation of the device described above, is as follows:

After the tire building process on drum 3 has been completed, the compressed air is expelled from the tubular bag of the drum to release the tire for removal from the drum 3 and from the tire building machine. These operations are carried out mechanically by the device 1 of the invention without manual assistance.

At the beginning of the working cycle of the device, the frame 11 is in the position of its lower limit; this position is required to keep the device in a position sufficiently low, that the rollers 26 and 28 will not contact the external surface of a tire on building drum 3, when the device is shifted together with the transfer ring 7 towards tire 8. At the beginning of the working cycle, the swinging arm 32, is rotated completely in the clockwise direction of FIG. 2, to ensure that the rollers 40 and 45 will not come into contact with the tire surface when the device is shifted towards tire 8.

If it can be supposed that at the beginning of the cycle, the transfer ring 7 will be at the position represented in FIGS. 1 and 3, this cycle will take place by activating first the means which control the translation of the ring 7 towards the right in the FIG. 1, until it brings the frame 11 into a position below the tire 8; the movement of the ring is stopped when the rollers of the two pairs of rollers 26 and 28 are symmetrically disposed with repsect to the equatorial plane of the tire. Successively, the motor 14 is actuated in such a way as to determine the raising of the frame 11 with respect to the ring 7. This movement is stopped as soon as the conical surface 27 of the rollers 26 and 28 come into contact with the surface of the tire sidewalls. These first phases of the working cycle of the device are effectuated while the building-drum 3 is still in rotation, so that the rollers 26 and 28 are caused to rotate when they contact the surface of the tire. Rollers 26 and 28 support the tire during rotation.

Figure 3:
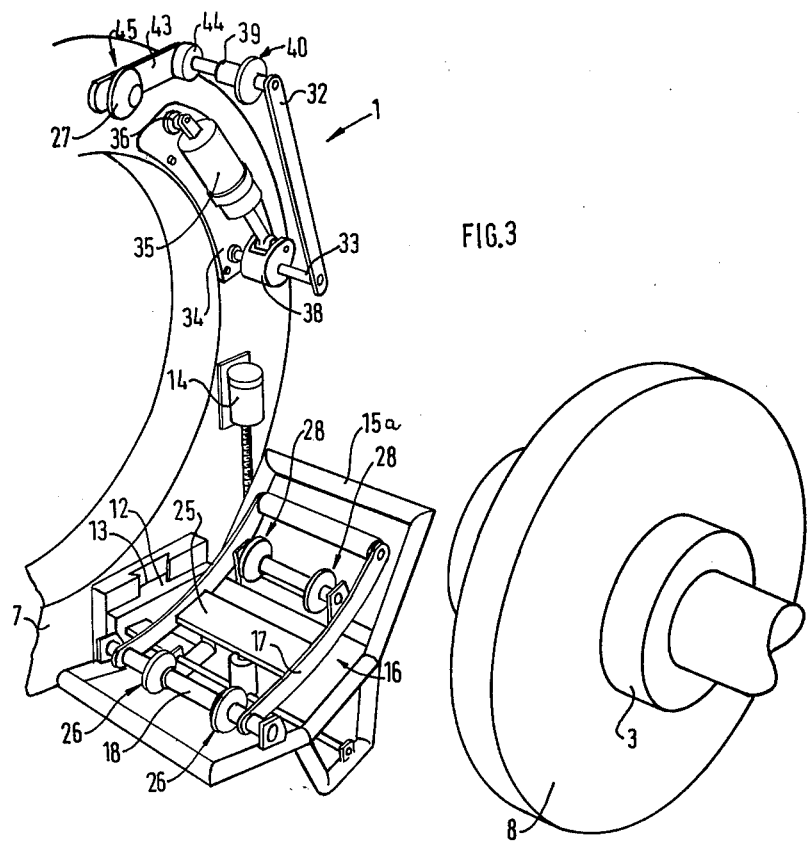
FIG. 3 is a fragment perspective view of the embodiment of the invention of FIG. 2 in a position spaced from a tire building drum prior to removal of the tire from the drum.

Simultaneous to the actuation of the motor 14 which controls the raising of the frame 11, the fluid-dynamic cylinder 35 which controls the rotation of the swinging arm 32 is also activated, to move arm 32 from its at rest position in FIGS. 2 and 3, into a working position, where the conical surface 27 of the rollers 40 and 45 come into contact with the tire surface, as shown in FIG. 4. At the end of this first part of the working cycle of the device, the tire is supported by the rollers, in four different zones, each one coinciding with the diametrical plane of the tire, and hence, the tire is guided perfectly and held during the rotation of the building-drum.

Figure 5:
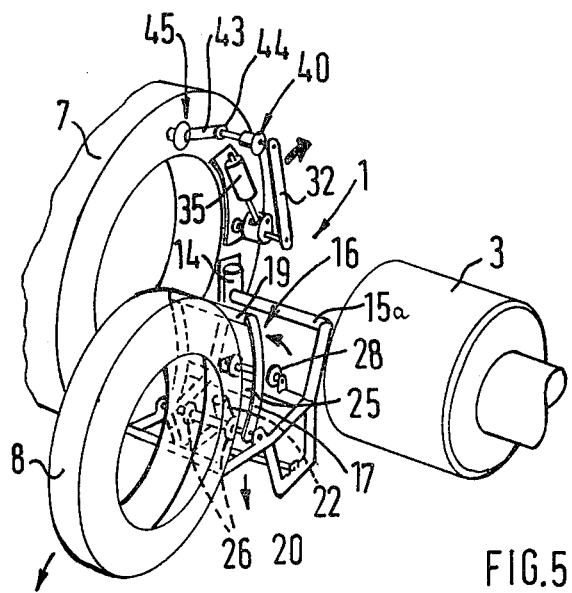
FIG. 5 illustrates in a perspective view the device releasing the tire after it has been removed from the tire building drum.

When the air in the inner tube of the building-drum 3 has been completely expelled and the beads of the tire are free from the tube, the means which control the axial translation of the transfer ring 7 are again activated to move the ring to the left when disposed as shown in FIG. 1. During this movement, the tire 8 is taken off the drum by means of the rollers 26 and 28 which press against the tire sidewall which is on the right of FIG. 1 and by means of the roller 40. The tire 8 is supported by these and other rollers when it has been completely removed from the drum. Transfer ring 7 stops in a predetermined position only after the tire has been completely removed and the fluid-dynamic cylinder 35 is successively activated in order to rotate the swinging arm 32 in the clockwise direction and to withdraw the rollers 40 and 45 from the tire surface. Finally, the fluid-dynamic cylinder 22 is activated which operates the rotation of the loom 16 in the counter-clockwise direction of FIG. 2 in such a way as to determine the unloading of the tire, as shown in FIG. 5. As can be seen in this figure, during the rotation of the loom 16, the element 19 and the slab 25 of the loom lean on the tire surface applying a sufficient force to it to make it roll onto the frame and from there towards a suitable unloading surface placed in the vicinity of the machine.

The fluid-dynamic cylinder 22 is then reactivated for operating the rotation of the loom 16 in the opposite direction to that of the preceding one and hence, the device is returned to its at rest position as in FIG. 2, thus to allow for the initiating of another work cycle.

It is evident that variations can be made in the structure of the embodiment described above without departure from the scope of the present invention.

In particular, it would be preferable to pre-dispose a diverse number of rollers similar to rollers 26, 28, 40 and 45, where they will contact different zones in the external surface of the tire for supporting the tire when it rotates on the building-drum 3 and for removing the tire from the drum. A pair of rollers can be disposed on spindle 39 instead of just one as for spindle 29 of the frame 11. Similarly, another spindle can be fixed at the ends of the lever 43. This spindle can be provided with a pair of rollers instead of just one. The loom 16 also can have a different structure from the one represented and described; and other parts may be foreseen which are suitable for coming into contact with the tire surface 8 for the purpose of unloading the tire from the device.

Although the invention is described in detail for the purpose of illustration it is to be understood that such detail is solely for that purpose and that variations can be made therein by those skilled in the art without departing from the spirit and scope of the invention except as it may be limited by the claims.

What is claimed is:

1. A device for removing and unloading a finished tire from a building-drum of a tire-building machine comprising a mobile frame adapted to support a tire, and means for moving the frame in a first direction parallel to the axis of said drum, and in a second direction which is perpendicular to the axis of the drum, said frame being provided with means for supporting the tire comprising a drum series of rotating rollers adapted to be brought into contact with pre-established zones on the surface of the tire in rotation and to be carried into rotation by the tire, and with means for unloading the tire from said frame which is capable of removing the tire with respect to said frame by movement in an orthogonal direction to that of said axis of the building-drum, said means for controlling the movement of the frame being activated successively, for the purpose of moving the frame, primarily in said first direction and in such a way as to take it substantially below a finished tire on the building-drum, and then for moving the frame in said second direction and in such a way as to take said rotating rollers of the supporting means in contact with said tire zones, and for moving successively the frame in said first direction but in the opposite sense to the preceding one in such a way as to remove the tire from its building-drum, and said means for unloading the tire from the frame being operated after the actuation of means for controlling the movement of the frame for removing the tire with respect to the frame itself in said orthogonal direction of the axis of the building-drum and for the unloading of the tire.

2. The device of claim 1 comprising a swinging arm, and means for controlling the movement of said arm itself in the said first direction parallel to the axis of the said drum, said drum being provided with a second series of rotating rollers also adapted for being brought into contact with pre-established zones on the tire surface, the oscillations of said arm being controlled by operating means capable of taking it from a first at rest position, where said rollers are not in contact with the tire, to a second position, where said rollers come into contact with the said tire zones.

3. The device of claim 1 wherein said machine comprises a winding-drum for the tire breaker plies, on which is prepared an assembly of plies for this tire breaker, and a transfer ring capable of moving substantially in said first direction parallel to the drum axis for transferring said assembly of plies from the winding-drum to the building-drum, said mobile frame and the said swinging arm being connected to the said transfer ring.

4. The device of claim 3 wherein said means are disposed between the mobile frame and transfer ring for guiding the frame, said means being capable of permitting the shifting of the frame with respect to the ring, in the said second direction, said movement being operated by a motor and by means for dragging the frame actuated by the said motor.

5. The device of claim 3 wherein said swinging arm oscillates on a pivot fast with said transfer ring, said oscillation being controlled by a fluid-dynamic cylinder, the body of which is hinged to said ring and the shaft of which is hinged to a crank fast with said pivot.

6. The device of claim 1 wherein said frame comprises a pair of rollers, the rollers of each pair being disposed on a shaft, and having substantially conical surfaces suitable for coming into contact with the tire surface, with said shafts being parallel to each other.

7. The device of claim 6 comprising a loom which oscillates with respect to said frame substantially around an axis parallel to the axis of the said building-drum, said loom being provided with parts adapted for coming into contact with the tire surface for unloading it from the frame, the oscillations of said loom being operated by a fluid-dynamic cylinder disposed between it and the frame.

8. The device of claim 7 wherein the axis around which the said loom oscillates coincides with the axis of one of said shafts on which are disposed rollers of said first series of rollers.

9. The device of claim 2 wherein at least two of the rollers of the said second series of rollers are mounted on the swinging arm.

10. The device of claim 1 comprising a spindle fast with one end of said swinging arm, said spindle being substantially parallel to said first direction of the axis of the building-drum, at least one roller rotatably mounted on the spindle, a lever joined to the shaft and at least one roller on said shaft.

11. The device of claim 10 comprising means for permitting a variation to the angular position of the said lever with respect to the said swinging arm for varying the relative position of the rollers brought by the said lever with respect to the rollers brought by the said spindle.

12. In a tire building apparatus having longitudinally spaced breaker building-drum and tire building drum and means intermediate the two drums for transferring a breaker structure from the breaker building-drum to the tire building drum by back and forth movement therebetween, a means mounted on said intermediate means facing said tire building drum for removing a tire from the tire building drum which comprises means movably attached to said intermediate means for movement substantially perpendicularly with respect to the axis of the tire building drum disposed to move below a tire on the tire building drum and comprising a frame having a generally arcuate contour corresponding to a segment of the peripheral surface of a tire, means pivotably mounted on the frame having rollers disposed to contact the tire when the frame is disposed below the tire, means for moving the said frame into contact with the tire, means attached to said intermediate means disposed near the top of a tire on said tire building drum comprising an arm, means for moving said arm radially inwardly to against the side of the tire, means for moving said device longitudinally with said arm disposed against the side of the tire and pull the tire from the drum, and means for pivoting said pivotal means to discharge the tire therefrom after the tire is removed from the drum.

* * * * *